United States Patent
Vogedes et al.

(10) Patent No.: US 7,373,181 B2
(45) Date of Patent: May 13, 2008

(54) METHOD AND APPARATUS FOR SENDER CONTROLLABLE MODALITIES

(75) Inventors: Jerome O. Vogedes, Wind Lake, WI (US); Frank C. Colonna, Roselle, IL (US); James C. Ferrans, Wheaton, IL (US)

(73) Assignee: Motorola, Inc., Schaumburg, IL (US)

( * ) Notice: Subject to any disclaimer, the term of this patent is extended or adjusted under 35 U.S.C. 154(b) by 562 days.

(21) Appl. No.: 10/692,622

(22) Filed: Oct. 24, 2003

(65) Prior Publication Data

US 2005/0101302 A1    May 12, 2005

(51) Int. Cl.
H04B 1/38    (2006.01)

(52) U.S. Cl. .................. 455/567; 455/550.1; 455/419; 455/425; 340/7.58

(58) Field of Classification Search ................ 455/567, 455/410, 411, 412.2, 415, 456.1, 456.3, 550.1, 455/556.2, 90.1–90.2, 425, 414.2, 418–420; 340/825.36, 7.39, 7.28, 7.58–7.63; 709/203–207; 348/14.05; 379/102.01, 88.12, 100.05, 376.8, 379/374.01

See application file for complete search history.

(56) References Cited

U.S. PATENT DOCUMENTS

| | | | | |
|---|---|---|---|---|
| 5,715,308 | A * | 2/1998 | Shankarappa | 379/373.02 |
| 6,233,430 | B1 * | 5/2001 | Helferich | 340/7.21 |
| 6,314,306 | B1 * | 11/2001 | Harris | 455/566 |
| 6,459,913 | B2 * | 10/2002 | Cloutier | 455/567 |
| 6,618,600 | B1 * | 9/2003 | Chow et al. | 455/567 |
| 6,684,068 | B1 * | 1/2004 | Tikka et al. | 455/412.1 |
| 6,867,733 | B2 * | 3/2005 | Sandhu et al. | 342/357.07 |
| 6,993,364 | B2 * | 1/2006 | Sierawski et al. | 455/567 |
| 6,999,731 | B2 * | 2/2006 | Cronin | 455/418 |
| 7,039,428 | B1 * | 5/2006 | Helferich | 455/458 |
| 7,092,743 | B2 * | 8/2006 | Vegh | 455/567 |
| 7,139,806 | B2 * | 11/2006 | Hayes et al. | 709/207 |
| 2001/0005681 | A1 * | 6/2001 | Kim | 455/458 |
| 2001/0019953 | A1 * | 9/2001 | Furukawa et al. | 455/420 |
| 2002/0045466 | A1 * | 4/2002 | Teranishi | 455/567 |
| 2002/0186845 | A1 | 12/2002 | Dutta et al. | |
| 2003/0052769 | A1 * | 3/2003 | Helferich | 340/7.21 |
| 2003/0073450 | A1 * | 4/2003 | Laumen et al. | 455/466 |
| 2003/0088633 | A1 * | 5/2003 | Chiu et al. | 709/206 |

(Continued)

FOREIGN PATENT DOCUMENTS

JP    11-046377    *    2/1999

(Continued)

*Primary Examiner*—George Eng
*Assistant Examiner*—Kamran Afshar
(74) *Attorney, Agent, or Firm*—Vedder Price P.C.

(57) ABSTRACT

A method and apparatus (110) for sender controllable modalities includes the step of generating a communication command (108). The method and apparatus further includes generating a priority command (110) wherein the priority command includes a modality alert command. The priority command (108) may be any suitable command indicating a level of priority as it relates to the communication command (110). The method and apparatus further includes thereupon transmitting the communication command and the priority command (112) to the recipient device (120). The method and apparatus further includes the recipient device (120) verifying the sender device (100) and performing an internal verification (124) of whether the sender device (100) has the ability to override the internal modality setting and to verify if the priority level requests overriding the internal modality setting.

15 Claims, 6 Drawing Sheets

U.S. PATENT DOCUMENTS

| | | |
|---|---|---|
| 2003/0103611 A1 | 6/2003 | Lapstun et al. |
| 2003/0105812 A1 | 6/2003 | Flowers, Jr. et al. |
| 2003/0228866 A1* | 12/2003 | Pezeshki .................. 455/422.1 |
| 2004/0128359 A1* | 7/2004 | Horvitz et al. .............. 709/207 |
| 2004/0143636 A1* | 7/2004 | Horvitz et al. .............. 709/207 |
| 2004/0198471 A1* | 10/2004 | Deeds ..................... 455/575.1 |
| 2005/0215272 A1* | 9/2005 | Helferich .................... 455/512 |
| 2005/0245236 A1* | 11/2005 | Servi et al. .................. 455/411 |
| 2006/0212585 A1* | 9/2006 | Eaton et al. ................. 709/227 |

FOREIGN PATENT DOCUMENTS

| | | |
|---|---|---|
| JP | 11046377 A * | 2/1999 |
| WO | WO 02/09301 A2 | 1/2002 |

\* cited by examiner

METHOD AND APPARATUS FOR SENDER CONTROLLABLE MODALITIES

BACKGROUND OF THE INVENTION

The present invention relates generally to an electronic communication device and more specifically to a recipient device notification alert system adjustable in response to a sender device.

With the growth of wireless devices, there is a concurrent growth in providing adaptability and improved ease of use and interactivity. The wireless device may be any device capable of transmitting and/or receiving communication from a wireless or non-wireless device or network, a server or other communication network, including, but not limited to, a cellular phone, a laptop computer, a desktop computer, a personal digital assistant (PDA), a pager, a smart phone, or any other suitable device as recognized by one having ordinary skill in the art.

As wireless devices become more integral for communication, there also exists a growth in the ability for the wireless device to provide improved forms of notification to an end user. With the growth of wireless devices, there is a growth in the amount of usage of the device, therefore various techniques may be employed to notify a user of an incoming call, message or notification. For example, currently wireless devices allow for a variety of different ring tones, a vibration alert, flashing light notification, a caller identification alert.

Moreover, wireless devices allow for further personalization such as allowing a specific ring tone to be specific to a particular incoming message from another wireless device. For example, a wireless device may have a standard beeping ring tone for normal incoming messages, but a user may set a specific musical ring tone to designate a particular incoming call, such as a friend, relative, co-worker.

Wireless devices currently include further personalization, such as the above-mentioned ring tones, and also provide for a larger array of applications. With the growth of messaging systems, such as the MMS, SMS and EMS systems, wireless devices can provide more than straight two-way communication, but also may become a portal for time-sensitive information. Therefore, it becomes more difficult for an end user to filter the incoming messages and determine message importance.

Current wireless devices fail to provide for specific high priority communications, wherein the sending device determines the priority. For example, a supervisor may be attempting to contact a co-worker regarding an emergency at work. Upon receipt of the notification, the co-worker cannot immediately determine if the communication is urgent, therefore the co-worker must either take time to engage to device to determine the caller and the communication priority or choose to ignore the incoming communication request.

It is also recognized that the co-worker may set an internal setting to give the communication device a supervisor-specific notification, such as a specific ring tone. Although, in the event of an emergency, an incoming communication bears the same level of priority as all other incoming communications from the supervisor, from the perspective of the recipient communication device. Once again, the co-worker can only immediately determine the originator of the incoming communication, but cannot determine an incoming communication priority level. As such, a sender device cannot provide high priority notification commands to a recipient device.

BRIEF DESCRIPTION OF THE DRAWINGS

The invention will be more readily understood with reference to the following drawings wherein.

DETAILED DESCRIPTION OF A PREFERRED EMBODIMENT OF THE INVENTION

A method and apparatus for sender controllable modalities includes the step of generating a communication command. The communication command may be any type of command for communication, such as a text message, an SMS, MMS, EMS, an auditory message, a caller ID for an impending voice connection, a visual message, or any other suitable communication as recognized by one having ordinary skill in the art.

The method and apparatus further includes generating a priority command wherein the priority command includes a modality alert command. The priority command may be any suitable command indicating a level of priority as it relates to the communication command, such as a scaled number, an associated priority level, for example low, medium or high, or any other suitable priority indicator as recognized by one having ordinary skill in the art.

Furthermore, the modality alert command may be any other suitable type of command insertable within the priority command, such as a mark-up language encoded header containing specific information to adjust the modality of a notification system within a recipient device, overriding the recipient device internal modality setting. In one embodiment, a modality alert command may be a command to provide for a recipient device output notification as a vibratory alert, a ring-tone alert, a wake-up alert, a text-based alert, an illumination alert, or any other suitable alert as recognized by one having ordinary skill in the art, including the combination of any of the above noted alerts.

The method and apparatus further includes thereupon transmitting the communication command and the priority command to the recipient device. In one embodiment, the recipient device is any wireless device allowing for an override of an internal modality setting, which defines how the recipient device alerts the user of an incoming message or command, thereupon allowing for the modality alert command within the priority command to be utilized as a notification alert. In one embodiment, the method and apparatus for sender controllable modalities further includes the recipient device verifying the sender device and performing an internal verification of whether the sender device has the ability to override the internal modality setting and furthermore to verify if the incoming communication command is of a priority level such that overriding the internal modality setting is requested.

Figure 1:
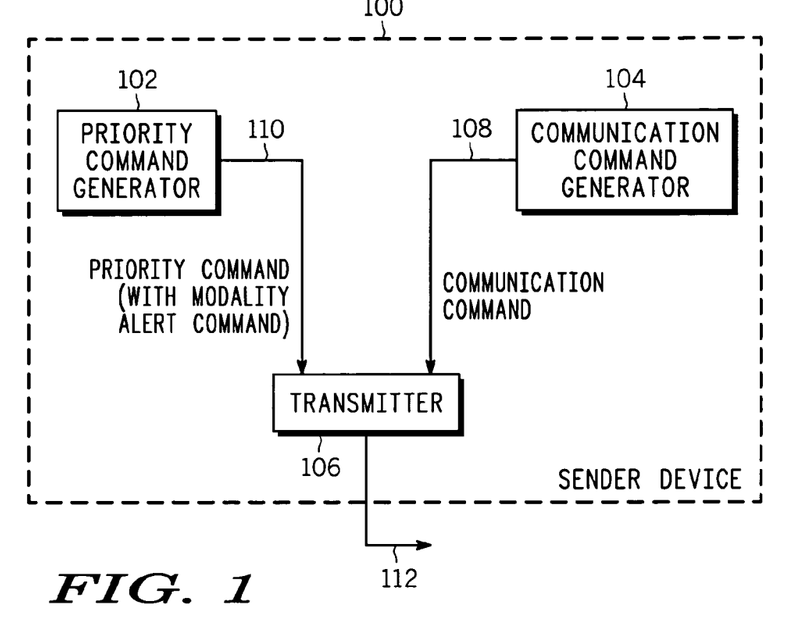
FIG. 1 illustrates a block diagram of a sender device for sender controllable modalities.

More specifically, FIG. 1 illustrates a sender device 100 which may be any suitable communication device, as noted above. The sender device 100 includes a priority command generator 102, a communication command generator 104 and a transmitter 106. As recognized by one having ordinary skill in the art, many elements with in the sender device 100 have been eliminated for clarity purposes only.

The communication command generator 104, which may be implemented in hardware, software or a combination thereof, generates a communication command 108. In one embodiment, the communication command generator 104 in response to an input from an end user generates the communication command 108. For example, a keypad (not shown) may be disposed within the sender device to allow entering of numbers or letters to initiate or generate the communication command. In another embodiment, the sender device 100 may further include a microphone (not shown) for receiving a voice-activated command, which is thereupon provided to the communication command generator 104 for generating the communication command 108.

The priority command generator 102 generates the priority command 110 wherein the priority command 110 includes a modality alert command. The priority command generator 102 may be implemented in hardware, software or a combination thereof such that the generator 102 receives input commands and thereupon generates the output priority command 110 having the modality alert command therein. Similar to the generation of the communication command 108, the modality alert command is generated in response to user input, designating a priority level for the content of the communication command 108. Further the modality alert command includes a preferred from for notification, for example a beeping ring tone.

As discussed above, the modality alert command may be a software encoded command disposed within a header of the communication command 108 or any other suitable implementation such that the modality alert command may be incorporated into the transmission 112 to a recipient device. As recognized by one having ordinary skill in the art, any suitable encoding, such as mark-up language, may be utilized to encode the modality alert command, including a command for a different notification alert in the recipient device.

Figure 2:
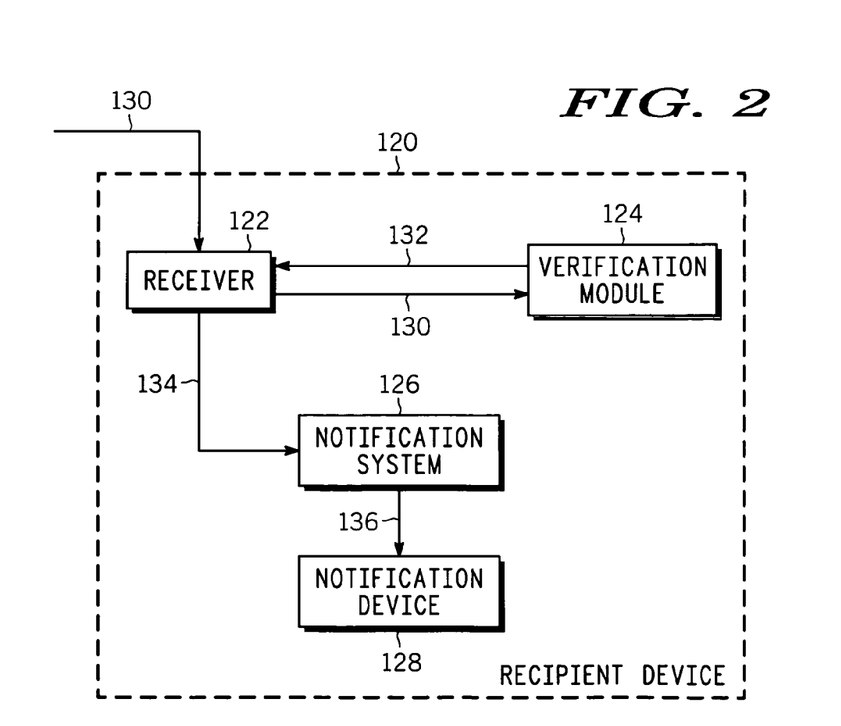
FIG. 2 illustrates a recipient device for sender controllable modalities.

FIG. 2 illustrates one embodiment of a recipient device 120. As discussed above, the recipient device may be any suitable wireless communication device allowing for the reception of the transmission signal 112 of FIG. 1 from the sender device 100. The recipient device 120 includes a receiver 122, a verification module 124, a notification system 126 and a notification device 128. The receiver 122 may be any suitable receiving device capable of receiving an incoming transmission signal 130. As noted above, as the recipient device 120 may be any suitable wireless device, the receiver 122 may be the corresponding receiving device, for example if the recipient device 120 is a wireless cellular telephone, the receiver 122 may be a signal decoder for receiving and decoding the incoming signal 130.

The receiver 122 is coupled to the verification module 124 such that upon receiving the incoming signal 130, wherein the incoming signal 130 includes the priority command with modality alert command 110 of FIG. 1 and the communication command 108 of FIG. 1, the receiver 122 provides a priority notification and a communication command notification 130 to the verification module 124. In one embodiment, the verification module 124 may be implemented in hardware, software or a combination thereof and includes a memory (not specifically illustrated) containing a list of suitable sender device identifiers, communication command identifiers, priority command identifiers, and any other suitable information such that the verification module 124 can make a determination of whether the recipient device 120 will allow the priority command to override an internal modality setting.

The verification module 124 returns a verification indicating signal 132 back to the receiver 122. In one embodiment, the verification indicating signal 132 may be a Boolean indicator indicating that either the incoming signal is verified and may override the internal modality setting or the signal is not verified, therefore the internal modality setting is used as type of notification alert.

Thereupon, the receiver 122 provides a communication command 134, similar to the communication command 108 of FIG. 1 from the sender device 100 to the notification system 126. Further included from the receiver 122 to the notification system 126 is the modality alert command, within signal 134, when the verification signal 132 indicates that the recipient device 120 allows overriding of the internal notification modality.

The notification system 126 may be implemented in hardware, software or a combination thereof for receiving the communication command 134 and if the communication command 134 also includes a modality alert command, the notification system 126 overrides an internal modality setting. In the event the communication command 134 does not include the modality alert command, the notification system 126 utilizes the internal modality setting.

Regardless thereof, the notification system 126 provides a notification command 136 to a notification device 128. In one embodiment, the notification device 128 may be any suitable device allowing for the notification of an incoming command, such as a speaker for providing an audio or audible output, such as a ring tone or audio message, a display screen for providing a text message, such as SMS, MMS or EMS, a plurality of illumination devices for providing an illumination pattern, a vibration device for providing a physical vibratory alert, or any other suitable notification device as recognized by one having ordinary skill in the art.

Figure 3:
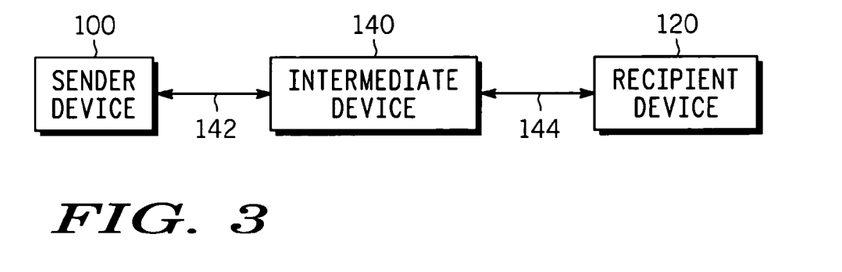
FIG. 3 illustrates a communication system allowing for sender controllable modalities.

FIG. 3 illustrates one embodiment of a system for sender controllable modalities. The system includes the sender device 100, the recipient device 120 and an intermediate device 140. The intermediate device 140 may be any suitable intermediate communication resource for facilitating communication from the sender device 100 to the recipient device 120 such as, but not limited to, a commercial wireless service provider, one or more communication servers connected through a network, an Internet, an intranet, a wireless application protocol gateway, an HTML transport, or any other suitable intermediate communication system as recognized by one having ordinary skill in the art.

The sender device 100 provides a communication signal 142 to the intermediate device 140, similar to utilizing the transmitter 106 for transmitting the transmission signal 112 of FIG. 1. The intermediate device 140 receives the signal 142 and may perform further processing on the signal or provide pass-through communication to the recipient device 120. Regardless thereof, the intermediate device 140 provides a communication signal 144 to the recipient device 120, such as to the receiver 122 receiving the communication signal 130 in the recipient device 120 illustrated in FIG. 2.

In another embodiment, the intermediate device 140 may provide for further functionality including the operation of specific functions previously described as being disposed within the sender device 100 and/or the recipient device 120. For example, the verification module 124 illustrated in the recipient device 120 of FIG. 2 may be disposed within the intermediate device 140, wherein the recipient device 120 provides the verification information to be stored on the intermediate device 140. Therefore, in this embodiment the intermediate device 140 may provide the communication command 108 and the modality alert command, upon verification, directly to the receiver 122 for overriding the notification device 128, illustrated in FIG. 2.

In another embodiment, the intermediate device 140 may include operations for providing a feedback operation to the sender device 100 such that the sender device may be provided with a priority command request based on a determination that a specific recipient device 120 has the ability to have its notification alert overridden. Therefore, in this embodiment, the sender device 100 may include a standard communication command generator, such as 104, and a transmitter, such as 106, and the functionality for sender controllable modality may be disposed within the intermediate device 140.

Figure 4:
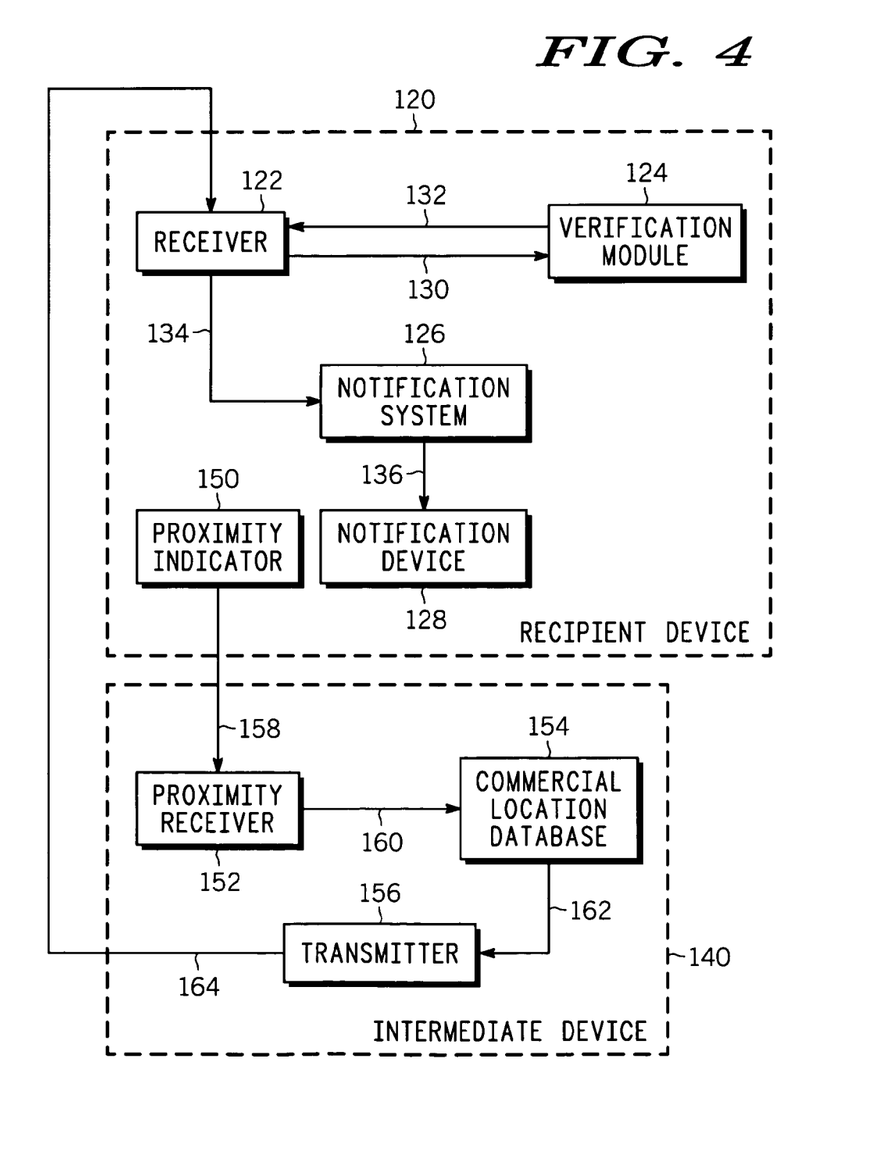
FIG. 4 illustrates a further embodiment of the communication system allowing for sender controllable modalities.

FIG. 4 illustrates another embodiment of functionality within the intermediate device 140 relative to the recipient device 120. In this embodiment, the recipient device 120 further includes a proximity indicator 150 which may be any suitable implementation in either hardware, software or a combination thereof for providing an overall location of the recipient device, such as a global positioning system, a signal strength indicator for triangulation of recipient device position or any other suitable proximity indication as recognized by one having ordinary skill in the art. In this embodiment, the intermediate device includes a proximity receiver 152, a commercial location database 154 and a transmitter 156. The proximity receiver 152 may be any suitable receiver capable of receiving the corresponding proximity indication signal 158 from the proximity indicator 150, such as a GPS based location signal.

The commercial location database 154 may be any suitable type of memory database structure allowing for referencing of location information 160 provided from the proximity receiver 152 for determining the orientation and proximity of the recipient device 120 relative to a commercial location referenced in the commercial location database. For example, a specific commercial establishment, such as a shoe store, may be located within a shopping mall. The shoe store may contain a proximity location referenced in the commercial location database such that when a location signal 160 is within a specific proximate physical range, the commercial database can reference a specific shoe store and thereupon retrieve a corresponding message 162 therefrom. In the above example, the shoe store may, upon being designated by the location signal 160, retrieve a corresponding coupon or other type of commercial based message. This commercial message 162 is provided to the transmitter 156.

The transmitter 156 may be any suitable transmitter, similar to the transmitter 106 of FIG. 1, capable of transmitting a transmission signal 164 to the receiver 122. Further included in the commercial signal 162 is a priority command with a modality alert command disposed therein. Therefore, the transmission signal 164 includes information for providing for the potential override of an internal modality setting within the recipient device 120. In this embodiment, the receiver 120 receives the transmission signal 164, provides verification through the verification module 124 by receiving the commercial information and priority information 130 and retrieving a boolean verification indication 132. The receiver 122 thereupon provides the communication command 134 to the notification system 126 wherein the communication command 108 is the modality alert command within signal 134 when the verification signal 132 indicates that the recipient device 120 allows overriding of the internal notification modality.

The notification system 126 provides a notification command 136 to the notification device 128. Similar to the operation of the notification device 128 described with respect to FIG. 2, the notification device 128 may provide the message output and further provide a notification in conjunction with the priority alert command. For example, if the commercial signal 162 includes a visual coupon, the notification device 128 may provide an intermediate device controlled modality notification alert, such as a ring tone of the shoe store's theme song/jingle and provide a text message illustrating the coupon, regardless of the internal settings of the recipient device 120.

Figure 5:
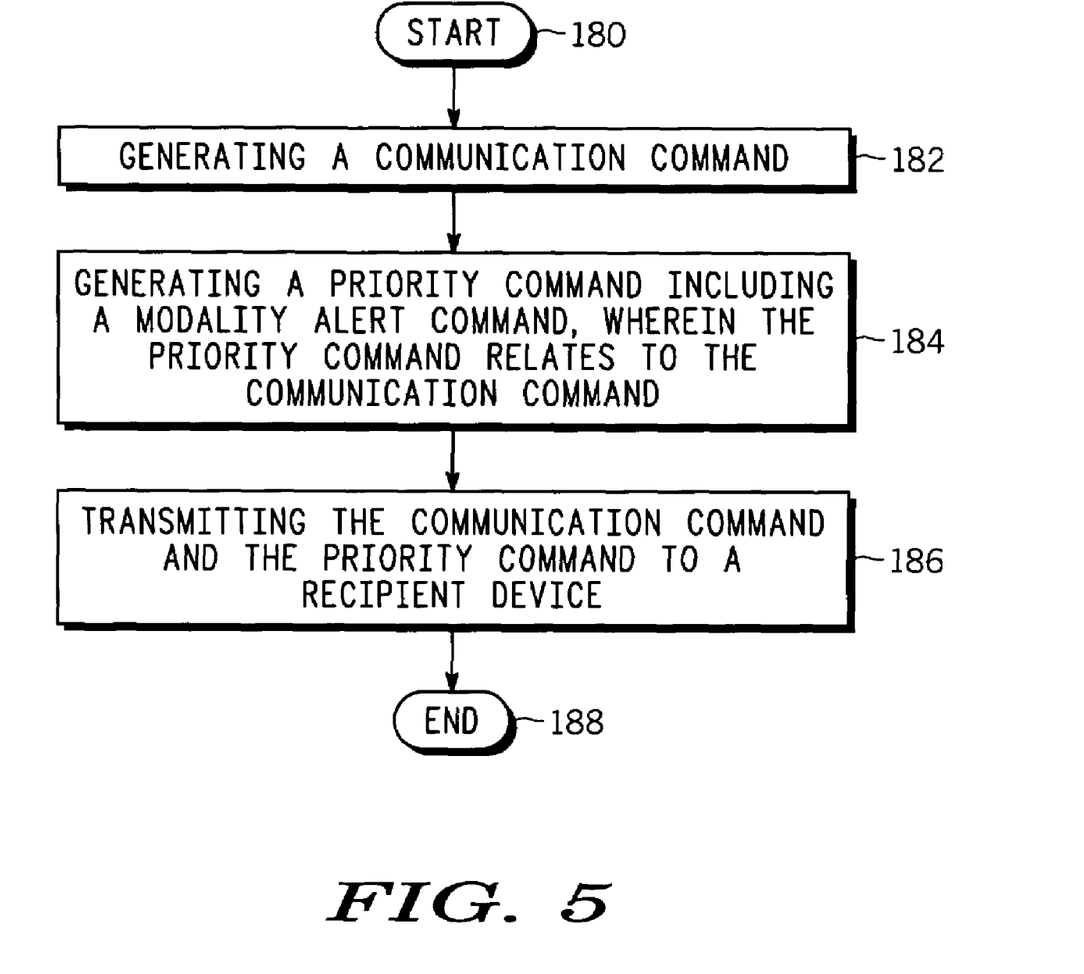
FIG. 5 illustrates one embodiment of a method for sender controllable modalities.

FIG. 5 illustrates a flowchart of the steps of one embodiment of a method for sender controllable modalities. The method begins, step 180, by generating a communication command, step 182. As discussed above, the communication command may be any suitable type of command for communicating with a recipient device. The next step, step 184, is generating a priority command including a modality alert command, wherein the priority command relates to the communication command. In this step, the priority command may be any suitable command indicating a priority level of the corresponding communication command and the priority command includes instructions or data providing for the activation of a specific type of alert. Step 186 is transmitting the communication command and the priority command to the recipient device. Similar to the embodiments described above with regards to FIGS. 1 and 2, the recipient device receives the communication command and the priority command such that, upon verification, the recipient device may allow for the modality alert command to override an internal modality setting and provide a sender controlled notification in conjunction with the communication command. Thereupon, the method is complete, step 188.

Figure 6:
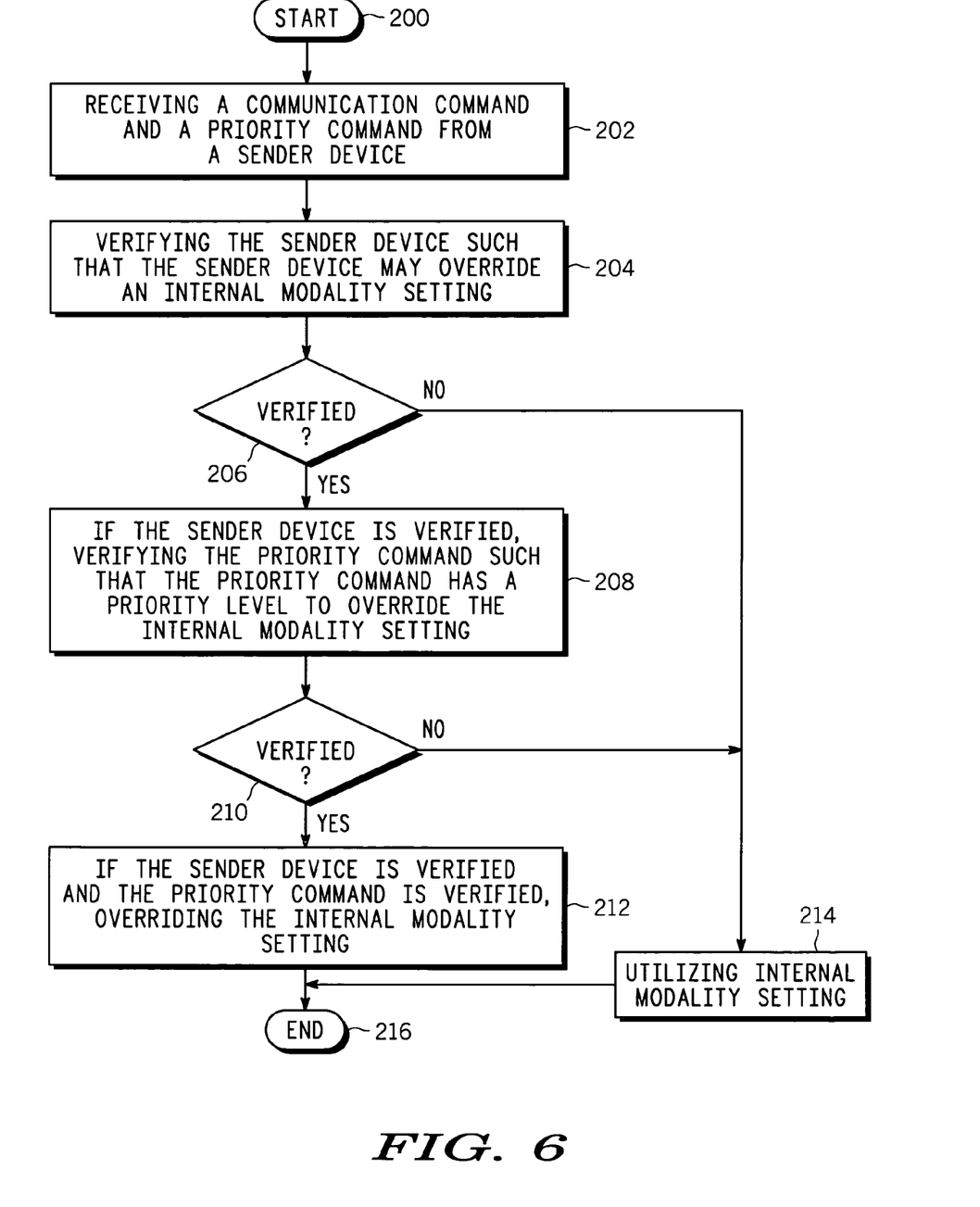
FIG. 6 illustrates another embodiment of a method for sender controllable modalities.

FIG. 6 illustrates one embodiment of a method for sender controllable modalities relative to a recipient device. The method begins, step 200, by receiving a communication command and a priority command from a sender device, step 202. As discussed above, the sender device 100 of FIG. 1 provides the communication command 108 and the priority command 110. The next step, step 204, is verifying the sender device such that the sender device may override an internal modality setting. In the illustrated recipient device of FIG. 2, the verification module 124 verifies whether the sender device is authorized to override an internal modality setting and further if the communication command has a priority level, as indicated by the priority command, which warrants overriding the internal modality setting.

In step 206, if the sender device is verified, the next step is verifying the priority command such that the priority command has a priority level to override the internal modality setting, step 208. If the sender device is verified and the priority command is verified, step 210, the next step is overriding the internal modality setting, step 212.

As illustrated in the chart of FIG. 6, if the sender device is not verified in step 206 or if the sender device is verified in step 206 and the priority command is not verified, for example not having a high enough level of priority, the recipient device utilizes the internal modality setting, step 214. Thereupon, the method is complete, step 216.

Figure 7:
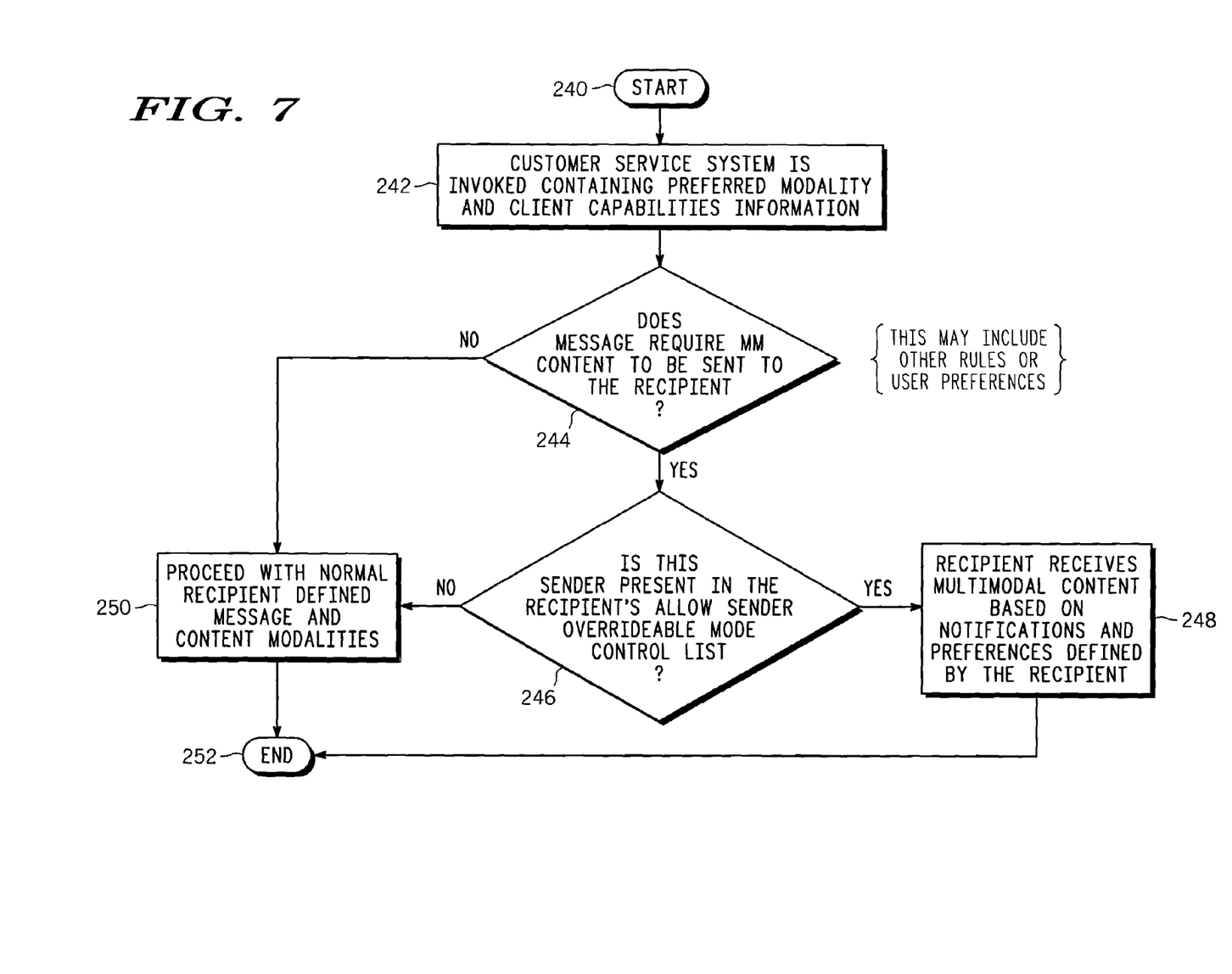
FIG. 7 illustrates an alternative embodiment utilizing the method for sender controllable modalities.

In another embodiment, the sender controllable modalities may further include for allowing the sender device to override output formats for communication commands, such as 108 of FIG. 1. FIG. 7 illustrates a flowchart of the steps of one embodiment, the method begins, step 240, by a customer service system being invoked, wherein the customer service system contains preferred modality and client capability information, step 242. In one embodiment, the customer service system may be directly related to the wireless device, for example setting up and establishing various functional components within the wireless device such as, but not limited to, setting up a call forwarding function on the wireless device. The next step, step 244 is a decision of whether the message requires multi-modal content to be sent to the recipient device. As indicated in FIG. 7, the step may include other rules or user preferences as defined by the customer service system, such as rules directed to the ability of the recipient wireless device, the available system bandwidth, or any other suitable rules or preferences related to multi-modal content being sent to the recipient device, as recognized by one having ordinary skill in the art.

In the event that the message does require multi-modal content, another determination is made as to whether the sender is present on the recipient's allow sender overridable mode control list, step 246, previously referred to as the verification step. This decision may be performed, similar to the verification module 124 illustrated in the recipient device 120 of FIG. 2, but, as discussed above, this determination of step 246 may be made within the customer service system which may be located on the sender device or disposed within a module operating on an intermediate device, such as the intermediate device 140 of FIG. 3. If the sender is present in the recipient's allow sender overridable mode control list, the next step, step 248, is that the recipient receives multi-modal content based on notifications and preferences defined by the recipient. In one embodiment, the notifications may include visual messages displayed on an output display screen, illumination of specific keypad buttons.

In the event that step 244 does not require multi-modal content to be sent by the recipient or multi-modal content must be sent to the recipient and the sender is not present in the recipient's allow sender overridable mode control list, the next step, step 250, is that the recipient device proceed with normal recipient defined message and content modalities. For example, the recipient device acts in accordance with its own internal settings and not allowing for the sender to override the internal setting. Thereupon, the method is complete, step 252.

Figure 8:
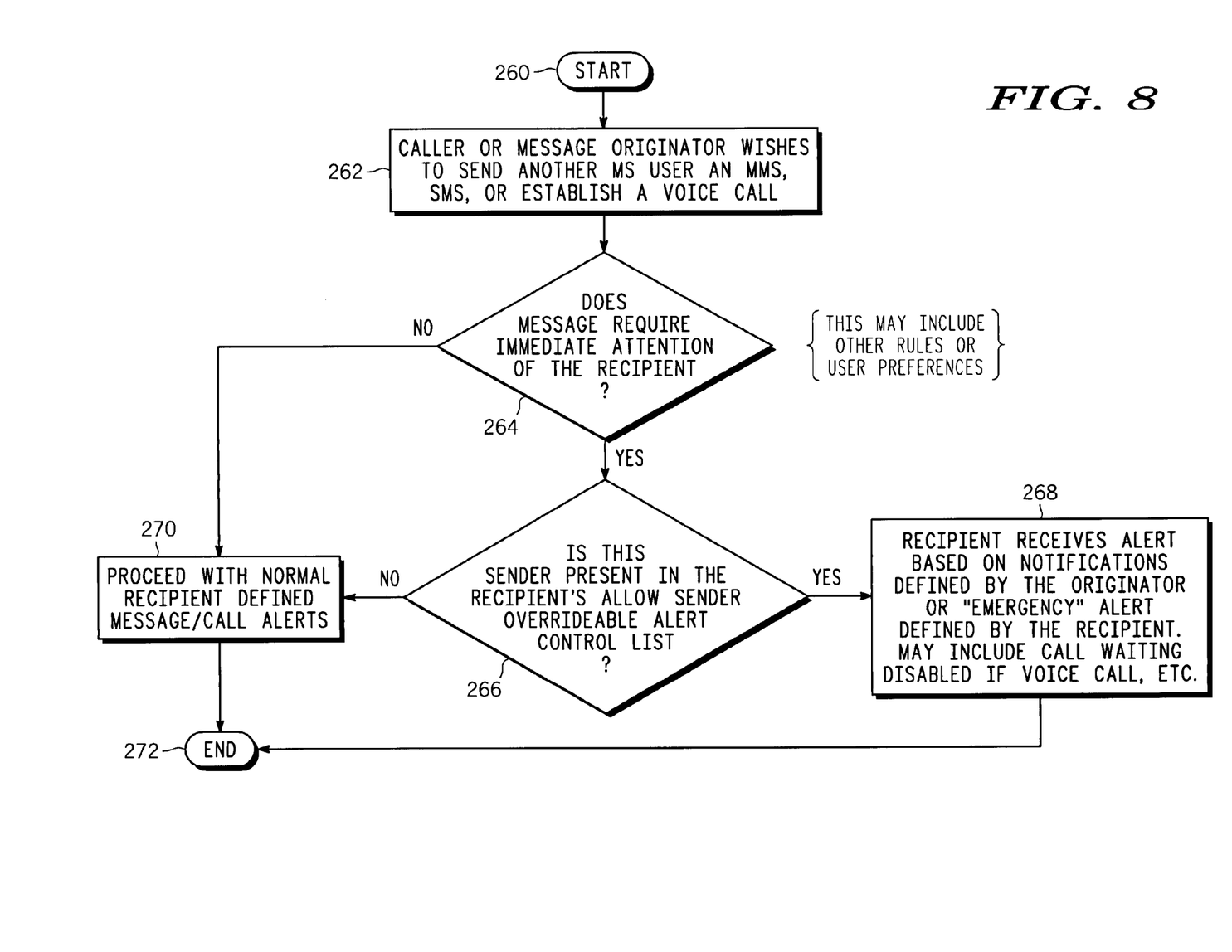
FIG. 8 illustrates a flowchart of an alternative embodiment of the method for sender controllable modalities.

FIG. 8 illustrates another embodiment of a method utilizing the sender controllable modalities. The method begins, step 260, wherein a caller or message originator wishes to send a message system user an MMS, SMS, or establish a voice call, step 262. A determination is made as to whether the message requires immediate attention of the recipient, step 264, for example, determining if the message is an emergency or of a high enough priority level. As noted in FIG. 8, this may include other rules or user preferences, such as the ability of the recipient device to allow notification for immediate attention, or any other suitable rules or preferences as recognized by one having ordinary skill in the art. If the message does require immediate attention, the next determination is if the sender is present and the recipient allow sender overridable alert control list, step 266, similar to the verification module 124 of FIG. 2 or similar to the commercial location database 154 of FIG. 4.

If the sender is present in the recipient's allow sender overridable alert control list, the recipient receives an alert based on notifications defined by the originator or an emergency alert defined by the recipient, step 268. For example, this may include activating call waiting if it had been previously disabled during a voice call, awakening a sleeping recipient device from a sleep mode, providing an alternative ring tone, adjusting the vibration mode, a combination of different types of notifications, or any other suitable alert as recognized by one having ordinary skill in the art.

In the event that the message does not require the attention of the recipient or the message does require the attention of the recipient and the sender is not present in the recipient's allow sender overridable alert control list, the method proceeds to 270 wherein the recipient device proceeds with normal recipient defined message/call alert. Thereupon, the method is complete, step 272.

It should be understood that there exists implementations of other variations and modifications of the invention and that various aspects, as may be readily apparent to those of ordinary skill in the art, and that the invention is not limited by the specific embodiments described herein. For example, the intermediate device 140 may include a plurality of intermediate devices in combination thereof such that the message 142 from the sender device is eventually provided to the recipient device 120. The intermediate device 140 may contain further levels of functionality, in response to commands from the sender device 100 and the recipient device 120 such that the recipient device 120 may be overridden for emergency alerts and thereby reducing the amount of processing requirements within the recipient device 120. It is therefore contemplated to cover by the present invention, any and all modifications, variations, or equivalents that fall within the spirit and scope of the basic underlying principles disclosed and claimed herein.

What is claimed is:

1. An apparatus for sender controllable modalities, the apparatus comprising:

a notification system having an internal alert modality setting;

a receiver operably coupled to the notification system, wherein the receiver receives a communication command and a priority command that indicates a level of priority as related to the communication command and from a sender device;

a verification module operably coupled to the receiver such that the verification module verifies the sender device and the priority command so that if the sender device is verified and the priority command is verified, a modality alert command is provided to the notification system to override the internal modality setting, wherein the modality alert command is disposed within a notification command; and a notification device operably coupled to the notification system such that in response to the notification command, the notification device provides an alert in accordance with the modality alert command.

2. The apparatus of claim 1 further comprising:

a position location device such that the position location device generates a location indicator;

a transmitter operably coupled to the position location device such that the transmitter transmits the location indicator to an intermediate server, wherein the communication command and the priority command may be received from the intermediate server based on the location indicator.

3. The apparatus of claim 1 wherein the modality alert command includes instructions such that the alert is at least one of the following: a vibration, a predetermined ring tone, one or more beeps, one or more flashing lights, a wake-up command and a defined output multi-modal output modality setting.

4. The apparatus of claim 1 wherein the verification module further includes a memory device storing a plurality of sender device identifiers and the internal modality setting such that the verification module verifies that the sender device may override the internal modality setting based on a comparison of the sender device with the plurality of sender device identifiers.

5. A method for sender controllable modalities in a recipient device, the method comprising:
  receiving a communication command and a priority command that indicates a level of priority as related to the communication command and from a sender device;
  verifying the sender device such that the sender device may override an internal modality setting;
  if the sender device is verified, verifying the priority command such that the priority command has a priority level to override the internal modality setting; and
  if the sender device is verified and the priority command is verified, overriding the internal modality setting.

6. The method of claim 5 further comprising:
  prior to receiving a communication command and a priority command, transmitting a proximity indicator indicating the general location of the recipient device.

7. The method of claim 5 wherein the modality alert command includes at least one of the following: a vibratory alert, a ring-tone, a wake-up command, a text-based alert, an illumination alert and a defined output multi-modal output modality setting.

8. The method of claim 5 wherein the communication command may be at least one of the following: a caller identification, a text message, an auditory message and a visual message.

9. The method of claim 5 wherein the step of receiving the communication command and the priority command from the sender device further includes receiving the communication command and the priority command to from intermediate server wherein the intermediate server receives the communication command and the priority command from the sender device.

10. The method of claim 9 wherein the step of verifying the sender device may be performed on the intermediate server and the step of verifying the priority command may be performed on the intermediate server.

11. A system for sender controllable modalities, the system comprising:
  a sending device including:
    a priority command generator capable of generating a priority command that indicates a level of priority as related to a communication command and that includes a modality alert command;
    a communication command generator capable of generating the communication command; and
    a transmitter operably coupled to the priority command generator and the communication command generator such that the priority command and the communication command are transmitted to a recipient device; and
  the recipient device including:
    a notification system having an internal alert modality setting;
    a receiver operably coupled to the notification system, wherein the receiver receives the communication command and the priority command from a sender device;
    a verification module operably coupled to the receiver such that the verification module verifies the sender device and the priority command so that if the sender device is verified and the priority command is verified, a modality alert command is provided to the notification system to override the internal modality setting, wherein the modality alert command is disposed within a notification command; and
    a notification device operably coupled to the notification system such that in response to the notification command, the notification device provides an alert in accordance with the modality alert command.

12. The system of claim 11 wherein the sender device further includes an input device operably coupled to the communication command generator such that the communication command generator generates the communication command in response to an input communication command and the input device operable coupled to the priority command generator such that the priority command generator generates the modality alert in response to an input priority command.

13. The system of claim 11 wherein the recipient device further includes a position location device such that the position location device generates a location indicator; and a transmitter operably coupled to the position location device such that the transmitter transmits the location indicator to an intermediate server, wherein the communication command and the priority command may be received from the intermediate server based on the location indicator.

14. The system of claim 11 wherein the communication command includes a multi-modal message such that the internal modality setting provides for an output display of the communication command and the modality alert command includes instructions for adjusting the form of output display for the communication command.

15. The system of claim 11 wherein the modality alert command includes instructions such that the alert is at least one of the following: a vibration, a predetermined ring tone, one or more beeps, one or more flashing lights, a wake-up command and a defined multi-modal output modality setting.

* * * * *